(12) United States Patent
Bowden, Jr.

(10) Patent No.: US 11,203,240 B2
(45) Date of Patent: Dec. 21, 2021

(54) WISHBONE STYLE CONTROL ARM ASSEMBLIES AND METHODS FOR PRODUCING SAME

(71) Applicant: DIVERGENT TECHNOLOGIES, INC., Los Angeles, CA (US)

(72) Inventor: Thomas Samuel Bowden, Jr., Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 280 days.

(21) Appl. No.: 16/389,890

(22) Filed: Apr. 19, 2019

(65) Prior Publication Data

US 2020/0331313 A1 Oct. 22, 2020

(51) Int. Cl.
*B60G 7/00* (2006.01)
*B33Y 80/00* (2015.01)
*B33Y 10/00* (2015.01)

(52) U.S. Cl.
CPC .............. *B60G 7/001* (2013.01); *B33Y 10/00* (2014.12); *B33Y 80/00* (2014.12);
(Continued)

(58) Field of Classification Search
CPC ........................... B60G 7/001; B60G 2206/01; B60G 2206/10; B60G 2206/124; B60G 2206/82;
(Continued)

(56) References Cited

U.S. PATENT DOCUMENTS 3,006,627 A * 10/1961 Paulsen ................ B62K 25/005
267/280
3,037,271 A 6/1962 Schilberg
(Continued)

FOREIGN PATENT DOCUMENTS

EP        2982528 A1    2/2016
JP        5031643 B2    9/2012
(Continued)

OTHER PUBLICATIONS

US 9,202,136 B2, 12/2015, Schmidt et al. (withdrawn)
(Continued)

*Primary Examiner* — Barry Gooden, Jr.
(74) *Attorney, Agent, or Firm* — Arent Fox LLP (57) ABSTRACT

Wishbone-style control arm assemblies for a vehicle and methods for assembling the same are disclosed. A control arm assembly includes a first elongated segment having a first connection feature at one end of the first segment. The control arm assembly includes a second elongated segment having a second connection feature at one end of the second segment. Opposite longitudinal ends of the first and second segments may include third and fourth connection features, respectively, that are configured to interface with the vehicle. The first and second connection features are aligned to form an aperture that extends at least partially through the first and segment connection features, through which a bushing is press-fit and then swaged to form a strong connection that reduces or eliminates the need for mechanical fasteners or adhesive bonds. The bushing connection independently enables the control arm to maintain a secure connection between segments during operation of the control arm when assembled in the vehicle.

17 Claims, 3 Drawing Sheets

(52) U.S. Cl.
CPC .... *B60G 2204/41* (2013.01); *B60G 2206/124* (2013.01); *F16C 2326/05* (2013.01)

(58) Field of Classification Search
CPC .. B60G 2206/8209; B60G 2206/82092; F16C 2326/05
See application file for complete search history.

(56) References Cited

U.S. PATENT DOCUMENTS

| | | | |
|---|---|---|---|
| 3,995,406 | A | 12/1976 | Rosman |
| 4,778,199 | A * | 10/1988 | Haggerty ............... B60G 7/001 267/273 |
| 5,203,226 | A | 4/1993 | Hongou et al. |
| 5,564,521 | A * | 10/1996 | McLaughlin ............ B60G 9/00 180/352 |
| 5,720,833 | A * | 2/1998 | Grube .................... B29C 66/54 156/73.1 |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,324,940 | B1 | 12/2001 | Pazdirek |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,905,129 | B2 | 6/2005 | Runte |
| 6,919,035 | B1 | 7/2005 | Clough |
| 6,926,970 | B2 | 8/2005 | James et al. |
| 6,959,935 | B2 * | 11/2005 | Buhl ....................... B60G 7/001 280/124.11 |
| 7,152,292 | B2 | 12/2006 | Hohmann et al. |
| 7,163,219 | B2 | 1/2007 | Seksaria |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,414,002 | B2 | 4/2013 | Yu |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,783,993 | B2 * | 7/2014 | Brunneke ............ F16F 1/3842 403/133 |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,168,801 | B2 | 10/2015 | Dicke |
| 9,186,848 | B2 | 11/2015 | Mark et al. |
| 9,187,166 | B2 | 11/2015 | Klahn |
| 9,193,237 | B2 * | 11/2015 | Hudler .................... B60G 7/00 |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |

(56) References Cited

U.S. PATENT DOCUMENTS

| | | |
|---|---|---|
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,751,370 B2 | 9/2017 | Weifenbach |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,662 B2 | 3/2019 | Shirakami et al. |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |

(56) References Cited

U.S. PATENT DOCUMENTS

| | | | |
|---|---|---|---|
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2004/0075234 A1 | 4/2004 | Seksaria et al. |
| 2004/0155422 A1* | 8/2004 | Buhl ................... F16F 1/393 |
| | | | 280/93.502 |
| 2006/0108783 A1 | 5/2006 | Ni et al. |
| 2006/0232038 A1* | 10/2006 | Weise ................... F16C 7/08 |
| | | | 280/124.134 |
| 2010/0181740 A1* | 7/2010 | Kurosu ................. B60G 7/008 |
| | | | 280/124.135 |
| 2011/0033230 A1* | 2/2011 | Brunneke ............. F16F 1/393 |
| | | | 403/341 |
| 2011/0133423 A1 | 6/2011 | Jeong |
| 2011/0133425 A1* | 6/2011 | Jeong ..................... B60G 7/001 |
| | | | 280/124.134 |
| 2011/0198821 A1 | 8/2011 | Hessing |
| 2013/0069335 A1 | 3/2013 | Erdogan |
| 2013/0328283 A1* | 12/2013 | Korte ..................... B21D 53/90 |
| | | | 280/124.134 |
| 2014/0225343 A1* | 8/2014 | Hudler .................... B60G 7/00 |
| | | | 280/124.125 |
| 2014/0277669 A1 | 9/2014 | Nardi et al. |
| 2017/0057313 A1 | 3/2017 | Paulsen |
| 2017/0113344 A1 | 4/2017 | Schönberg |
| 2017/0341309 A1 | 11/2017 | Piepenbrock et al. |
| 2018/0001724 A1* | 1/2018 | He ........................ B60G 7/008 |
| 2018/0154720 A1 | 6/2018 | Souschek |
| 2018/0326803 A1* | 11/2018 | Meyer ..................... B60G 7/001 |
| 2018/0361481 A1 | 12/2018 | Tenhaeff |

FOREIGN PATENT DOCUMENTS

| | | |
|---|---|---|
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2012107272 A1 | 8/2012 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
First Notification to Make Rectifications Office Action with English translation received in corresponding Chinese Application 202020576843.7 dated Oct. 28, 2020.
International Search Report & Written Opinion received in PCT/US2020/026433 dated Jun. 15, 2020.

* cited by examiner

WISHBONE STYLE CONTROL ARM ASSEMBLIES AND METHODS FOR PRODUCING SAME

BACKGROUND

Field

The present disclosure relates generally to techniques for manufacturing vehicle components, and more specifically to wishbone-style control arm assemblies and methods for producing the same.

Background

Control arms are hinged links that couple a vehicle frame to the suspension, such as through the steering knuckle that holds the wheel. Different shapes and configurations of control arms are available. Depending on various factors like the frame and suspension types, multiple control arms may be implemented in a single vehicle.

Conventionally, wishbone-style control arms are manufactured using complex machining operations that result in a significant amount of material waste. For example, large blocks of material may be machined down to ultimately form the links or segments. A significant amount of residual material is often left over, which may be discarded or may result in recycling and other costs.

Furthermore, conventional wishbone-style control arm members are connected using mechanical connectors and fasteners, adhesives, welds, and other more complex connection methods. The use of these mechanical components, and sophisticated assembly techniques add complexity to the part. Fasteners and other mechanical connection methods also result in the undesirable addition of mass to the part. Conventional control arm assemblies are relatively heavy and unwieldy, and can adversely affect performance and fuel consumption requirements.

As demands for increased fuel economy and superior driving efficiency are continually increasing, so too is the need for manufacturers to minimize the size and mass of constituent parts of a vehicle without sacrificing structural and functional integrity.

SUMMARY

Various aspects of a wishbone-style control arm assembly are disclosed. In one aspect of the disclosure, a method for assembling a control arm for a vehicle includes providing a first segment having a first connecting feature and a second segment having a second connecting feature, aligning the first and second connecting features to form an aperture, press-fitting a bushing into the aperture, and swaging the press-fitted bushing, wherein the press-fitting and the swaging maintain, via the bushing, an independent connection between the first and second segments sufficient to accommodate expected operating loads when the control arm is assembled into the vehicle.

In another aspect of the disclosure, a method for assembling a control arm for a vehicle includes additively manufacturing a first segment comprising a first connection feature and a second segment comprising a second connection feature, aligning the first and second connection features in a manner that causes an aperture to extend at least partially through the first and second connection features, press-fitting a bushing into the aperture; and swaging the press-fitted bushing, wherein the press-fitting and the swaging maintain, via the bushing, an independent connection between the first and second segments sufficient to accommodate expected operating loads when the control arm is assembled into the vehicle.

In another aspect of the disclosure, a control arm assembly for a vehicle includes a first segment comprising a first connection feature at one end, a second segment comprising a second connection feature, the first and second segments being engaged together to form an aperture extending at least partially through the first and second connection features, and a bushing press fit and swaged through the aperture to thereby form a generally wishbone shaped base at the one end, the bushing being configured to provide an independent connection between the first and second segments sufficient to accommodate expected operating loads when the control arm is assembled into the vehicle.

DETAILED DESCRIPTION

This disclosure presents three-piece wishbone-style control arms for vehicles that overcome the above-referenced obstacles, and methods for assembling the same. Two elongated control arm segments are manufactured with connecting features at respective ends of the segments. A connecting feature on an end of one segment is aligned with a complementary connecting feature on an end of the other segment to form an aperture that extends at least partially through the aligned connecting features. A third stabilizing structure, such as a bushing, is press fit into the aperture (or plurality thereof) defined by the aligned connecting features. The bushing is then swaged to form a permanent, wishbone-shaped connection between the two segments. The result is a streamlined control arm having a generally simple configuration that requires minimal mass and that is conducive to providing axial load paths in a vehicle while minimizing out-of-plane loads (with respect to the control arm geometry).

The disclosed control arm assembly reduces or altogether eliminates the necessity of separate mechanical fasteners or additional mounting points. The assembly also eliminates the requirement of stiffening ribs and the resulting mass penalty that may otherwise be necessary to accommodate adhesive-based connections. In an embodiment, the segments and corresponding connection features are additively manufactured. Additively manufacturing the segments provides significant flexibility for effecting design changes and for adding design characteristics such as ridges or recesses to maximize the fidelity of press-fitting or swaging operations.

Conventional wishbone-style control arms use two control arm members along with mechanical connectors to couple the chassis to the suspension. One of the control arm members may be connected to the frame using bushings, and the other control arm member may be connected to the steering knuckle via a ball joint. Bushings are cylindrical linings that reduce friction and allow vertical up-and-down movement of the suspension while holding the knuckles, spindles, and axles firmly onto the vehicle. Ball joints may function as a pivot between the wheels and the suspension to facilitate the up-and-down movement. Control arms synchronize the wheel motion with the vehicle body while concurrently preventing excessive forward/rearward or other out-of-plane movement with respect to the control arm geometry that may otherwise occur as the vehicle encounters potholes, bumps and other obstacles.

Conventional control arm assemblies have excessive mass as noted above. Some of these assemblies involve a single, integral chunk of metal in a generally "V" or wishbone shape that include a number of sophisticated mechanical fasteners, bearings, and/or bushings. These larger metal structures can be unduly bulky and are generally not streamlined, and as such they add mass to the vehicle. In conventional embodiments where the control arm assemblies have separate links or segments, the links/segments are often large and cumbersome, and rely on welding and potentially heavy mechanical fasteners to interconnect with each other.

Further, where welding is used to connect the members of the control arm assembly, heat-affected zones (HAZ) may reduce the strength and integrity of the components. HAZ refers to a non-melted area of metal adjacent the weld that has experienced weakening in its material properties as a result of exposure to welding's high temperatures. To mitigate the adverse effects of HAZ, parts incorporating welding often include additional physical components to reinforce HAZ or to distribute HAZ away from the critical load paths. The incorporation of these components into the control arm results in additional mass and occupies additional space. Likewise, where adhesives are used, the control arm members are typically fitted with additional mechanical structures to ensure fidelity of the adhesive bonds.

Figure 1:
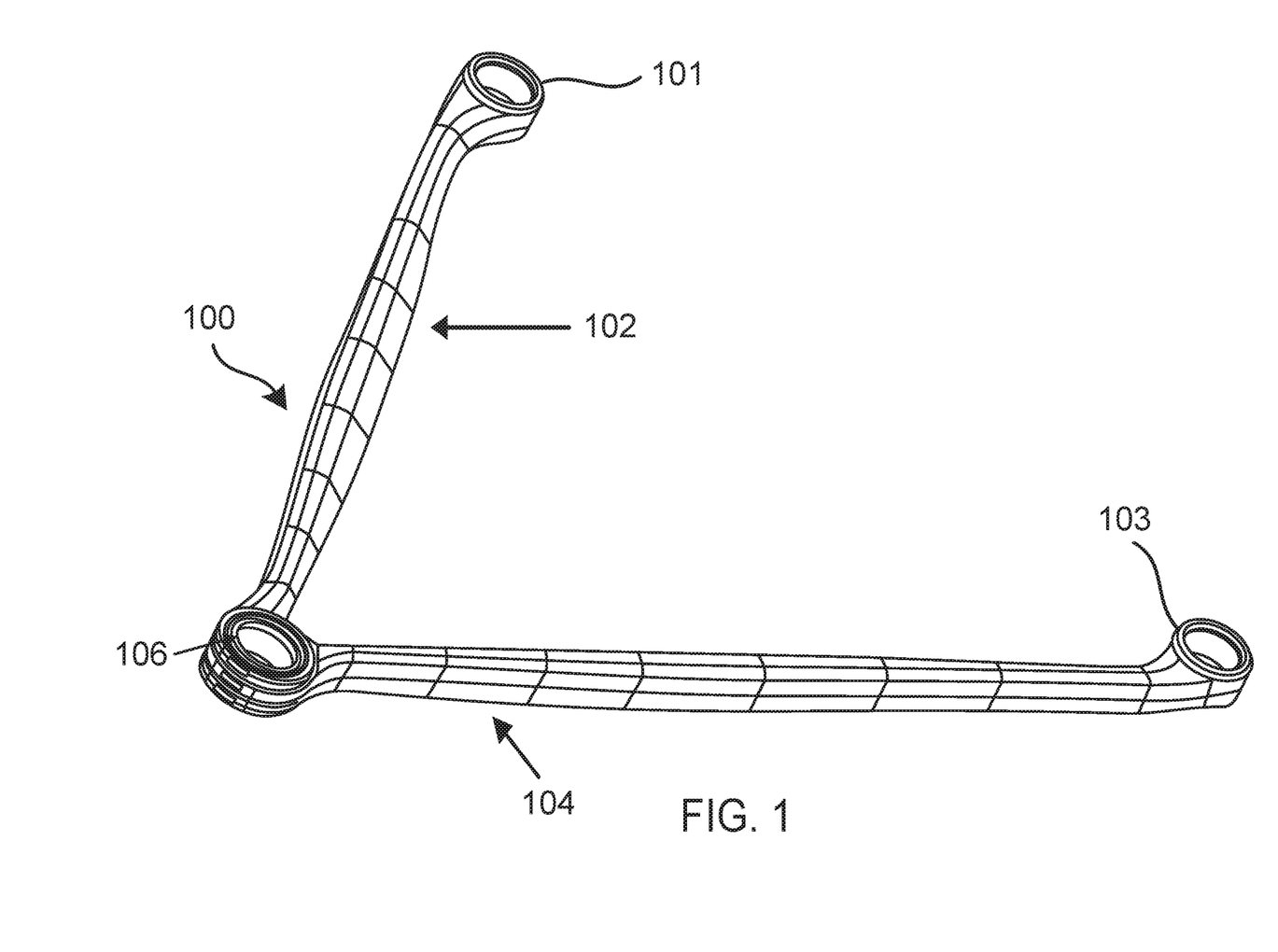
FIG. 1 is a perspective illustration of a three-piece wishbone-style control arm according to an aspect of the disclosure.

FIG. 1 is a perspective illustration of a three-piece wishbone-style control arm 100 according to an aspect of the disclosure. The control arm 100 includes a first segment, 102, a second segment 104 and a bushing 106 that is press fit and swaged at the aperture created by the alignment of the first and segment segments 102, 104, which may be located at or near the respective ends of the first and second segments 102, 104. More specifically, the ends of segments 102, 104 that form the wishbone base include connecting features that when aligned, define an aperture that acts as a receptacle for the bushing 106. The aperture may extend through the connection features, for example, in a direction that is generally perpendicular to the longitudinal directions of the segments. At the opposite end of each segment 102 and 104, respective circular structures 101 and 103 can be used to provide connecting features at those ends to interface with the relevant structures of the vehicle (e.g., the frame and suspension components). In other embodiments, structures 101 and 103 may include different types of geometrical structures for interfacing with the vehicle. In an embodiment, structures 101 and 103 have generally simple interfaces, such as elliptical loops composed of the segments' material, to minimize the mass and complexity of the control arm 100.

Figure 2:
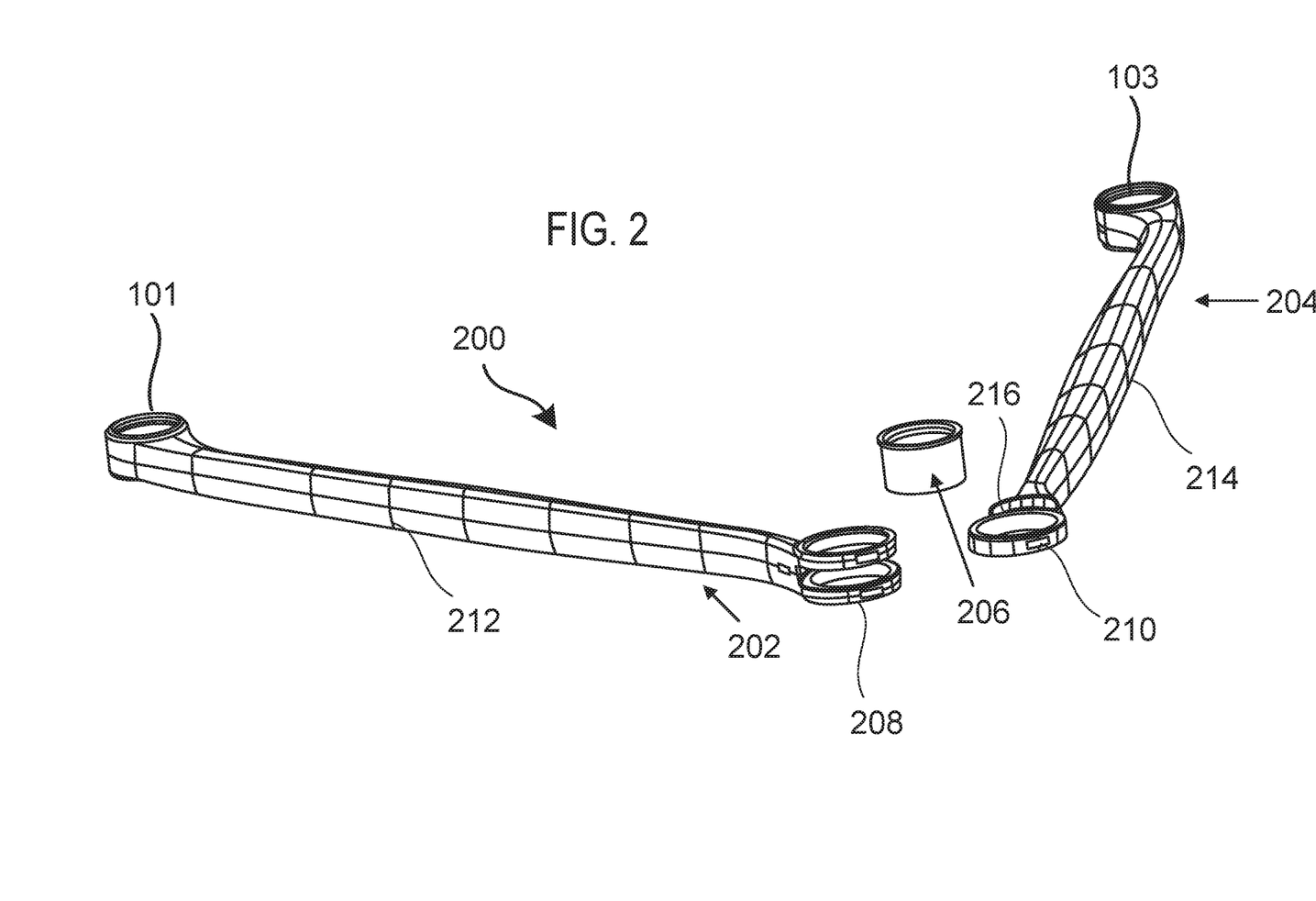
FIG. 2. is a perspective illustration of the three-piece wishbone-style control arm separated into its constituent parts.

FIG. 2 shows a perspective illustration of the three-piece wishbone-style control arm 200 separated into its constituent parts. As is apparent from the illustration of the separate elements of FIG. 2 and the combined elements of FIG. 1, the elongated segments 202 and 204 are configured to be assembled together like a clevis and tang in a clevis type fastener. Segment 202 includes connection feature 208. More specifically, the segment 202 having the pair of opposing elliptical/circular rings 208 bound at one portion to the body of segment 202 may be analogous to a clevis. Segment 204 includes a corresponding connection feature 210. The segment 204 having the single elliptical/circular ring 210 bound to the body of segment 204 (e.g., via a ridge 216 extending vertically from the segment) may be analogous to a tang. As described below, the first and second segments 202 and 204 are properly aligned to form an aperture running through connection features 208 and 210, and then connected via the bushing 206, the latter of which may be analogous to a clevis pin. The connection features may alternatively be manufactured to form other shapes or alternative connection types other than the clevis-tang connection type described herein.

A method for assembling the control arm according to various embodiments of the present disclosure is described. First, segments 202 and 204 (FIG. 2) are assembled. In one embodiment, the segments 202 and 204 are machined from bulk metal sections comparable in size to the segment. Thus, when the segment is machined, the amount of remaining scrap metal is kept to a minimum.

In other embodiments, the segments 202, 204 may be additively manufactured using powder bed fusion (PBF) or any other suitable 3-D printing technology. The use of AM to manufacture the segments 202, 204 accords the manufacturer significant flexibility to customize its parts. That is, the manufacturer can determine the segments' optimal sizes, mass, and material density and can easily modify these properties using computer-aided design (CAD) files to represent the 3-D control arm assembly. The manufacturer can develop individual attributes for the segments like the precise desired length and thickness of the segments at different points and can modify the corresponding CAD files when a different design is desired. The connectors and recesses may be strategically deployed in a manner that facilitates the effectiveness of the press-fitting and swaging operations and that is optimal for the vehicle into which the control arm will be assembled. Further, while the segments may generally benefit from their simplicity, the use of AM can allow the manufacturer to incorporate lattice elements or other supports to branch out from the segments for distributing the expected load more efficiently.

The ends of each segment that are determined to form the base of the wishbone may be additively manufactured to produce connection features such as the clevis-like structure and the tang, for mating with the clevis, as generally described above and as shown in FIG. 2 using the respective double and single circular rings 208 and 210. While the embodiment of FIG. 2 shows one configuration of the clevis-tang connection features, other configurations are also possible and the end connectors may be designed to vary from the circular rings. For example, square, elliptical, or arbitrary shapes may be used. In another embodiment, the clevis-like connector may be fork-shaped, or the connection features may adopt a configuration different from that of a clevis-tang connection.

After the segments 202, 204 are manufactured, they are then assembled together. Segment 202 includes a pair of opposed circular members 208 that extend from the body 212 of segment 202. In an embodiment, the circular members 208 are integrally formed with the body 212 such that both components are part of the same structure as originally assembled. Segment 204 includes a single circular member 210 that extends from the body 214 of segment 204. The circular member 210 is connected to a ridge 216, where the ridge abuts the body 214 of segment 204. In an embodiment, the circular member 210 is integrally formed with the body 214.

The connection features 208 and 210 that form the base of the wishbone may be aligned to form the aperture into which the bushing 206 is press fit. The connection feature, e.g., circular member 210, is inserted into and aligned between circular members 208, such that a generally flush and open cylindrical shape is created inside the joined circular members 208 and 210. As is shown in more detail in the cross-sectional view of the interface between members 202 and 204 of FIG. 3, the interior surface of one or more of circular members 208 and 210 may be manufactured to include indentations, recesses or other features that are integrated within these elements to increase the effectiveness of the subsequent press-fitting and swaging operations.

The circular members 208, 210 are pinned together using bushing 206. In an embodiment, following the alignment of the circular members 208 and 210, the bushing 206 is press-fit into the generally cylindrical area internal to the circular members 208 and 210. Advantageously, the press-fit operation relies on pressure and friction without the need for adhesive or other mechanical components that would otherwise add undesired mass and complexity to the system.

After press-fitting, the bushing 206 is swaged using a suitable swage tool. Using swaging, the bushing's 206 dimensions are changed by forcing the bushing into the cylindrical area internal to the circular members 208 and 210. The swaging secures the connection between the two segments 202, 204. Swaging is a time-efficient process that provides a secure and permanent connection between segments 202 and 204 without adding additional mass or mechanical connectors to the control arm 200.

Figure 3:
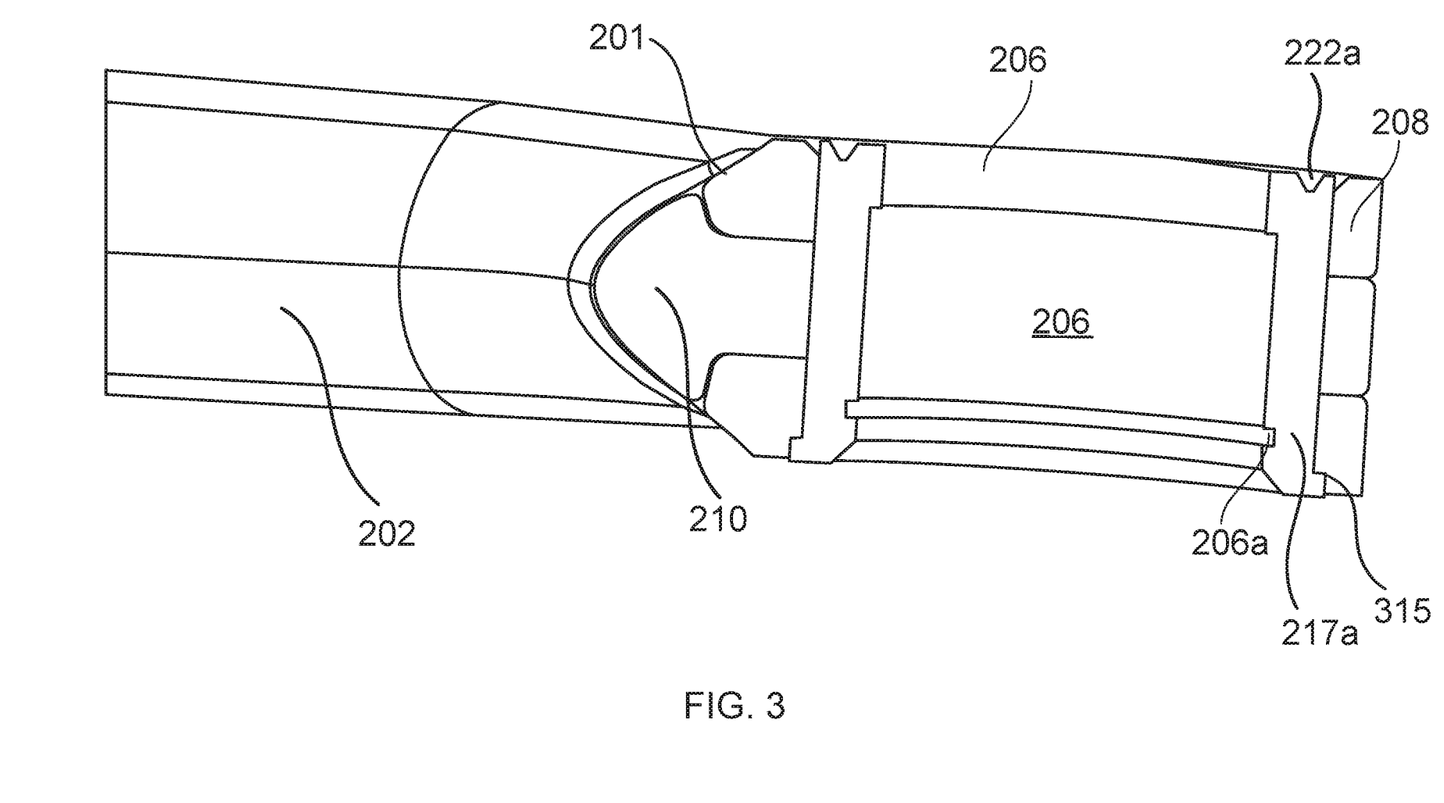
FIG. 3 depicts a cross-sectional view which shows the integration of the two segments and the bushing to form a connecting portion of the wishbone-style control arm member.

FIG. 3 depicts a cross-sectional view which shows the integration of the three structures 206, 208, and 210 to form a connecting portion of the wishbone-style control arm member. That is, FIG. 3 is a cross-sectional view of the wishbone base of the control arm of FIG. 2, in which the newly-shaped bushing 206 is press-fit and swaged into the aperture defined by the internal surface of circular members 208 and 210. As seen in the cross-sectional view of FIG. 3, the bushing 206 may include ridges 206a, external portion 217a, and upper recess 222a The internal surface of members 208 and 210 may receive the bushing as it is press-fit into place. Thereafter, the bushing may be swaged to form a simple, streamlined, yet permanent connection between the segments or links 204 (FIG. 2) and 206. In some embodiments as discussed above, members 208 and 210 correspond to a clevis-tang connection or similar interface for enabling the segments to form a strong link without undue complexity. An internal portion of member 208 may include a recess 315 to accommodate a geometrically complementary shape or ridge extending from portion 217a of bushing 206. The recess 315 may be present to receive the ridge to provide for a more secure connection between bushing 206 and member 208. In other embodiments, additional recesses may be present or a different recess may be used in member 210. During swaging or press-fitting, the ridge may be compressed into the recess to increase the overall strength of the connection. These details depend on the geometry of the bushing, the material(s) used in the bushing and corresponding connections, and therefore may vary.

The streamlined wishbone architecture described above advantageously provides axial load paths such that the forces on the control arm as installed in a vehicle are substantially parallel to the respective longitudinal axes of segments 202 and 204. This configuration minimizes loads paths that are out of the plane with respect to the control arm geometry defined by the segments 202, 204, which in turn reduces or eliminates moments. By contrast, in conventional control arms using mechanical fastening or adhesive bonds, additional components may be assembled with the control arm to mitigate out-of-plane loads. These additional components add yet additional mass to the part.

The above-described control arm assembly provides the additional benefit of optimized material placement relative to other components in the vehicle. Because the control arm geometry is selectively positioned relative to the suspension and frame of the vehicle, and the mass is minimized, these factors free up design space that can be used to package suspension components or position other structures, as necessary.

The previous description is provided to enable any person skilled in the art to practice the various aspects described herein. Various modifications to the exemplary embodiments presented throughout this disclosure will be readily apparent to those skilled in the art, and the concepts disclosed herein may be applied to other objects besides vehicles. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for assembling a control arm for a vehicle, comprising:
    providing a first segment having a first connecting feature and a second segment having a second connecting feature, wherein the first connecting feature and the second connecting feature each comprise one or more elliptically-shaped rings;
    aligning the first and second connecting features to form an aperture;
    press-fitting a bushing into the aperture; and
    swaging the press-fitted bushing,
    wherein the press-fitting and the swaging maintain, via the bushing, an independent connection between the first and second segments sufficient to accommodate expected operating loads when the control arm is assembled into the vehicle.

2. The method of claim 1, wherein the aperture extends at least partially through the first and second connecting features.

3. The method of claim 1, further comprising additively manufacturing the first and second segments.

4. The method of claim 1, further comprising machining the first and second segments.

5. The method of claim 1, wherein the first and second connecting features comprise respective clevis and tang fasteners.

6. The method of claim 1, wherein an outer surface of the bushing comprises a ridge configured to fit into a corresponding recess present in the first or second connection feature.

7. The method of claim 6, wherein the swaging further comprises compressing the ridge into the recess to increase a connection strength between the first and second segments.

8. A method for assembling a control arm for a vehicle, comprising:
   additively manufacturing a first segment comprising a first connection feature and a second segment comprising a second connection feature;
   aligning the first and second connection features in a manner that causes an aperture to extend at least partially through the first and second connection features;
   press-fitting a bushing into the aperture; and
   swaging the press-fitted bushing,
   wherein the press-fitting and the swaging maintain, via the bushing, an independent connection between the first and second segments sufficient to accommodate expected operating loads when the control arm is assembled into the vehicle,
   wherein the first connection feature comprises a pair of opposing rings defining a gap therebetween, and the second connection feature comprises a ring seated in the gap, wherein the aperture is defined at least in part by inner surfaces of the ring and the opposing rings.

9. The method of claim 8, further comprising additively manufacturing one or more recesses in at least one of the first and second segments, the recesses being configured to receive material from the bushing during the swaging.

10. The method of claim 8, wherein the additively manufacturing further comprises forming the first connection feature as a clevis fastener and forming the second connection feature as a tang.

11. The method of claim 8, wherein the additively manufacturing further comprises forming a ridge abutting a body of the second segment, a surface of the ridge arranged to receive a portion of the first connection feature during the aligning.

12. A control arm assembly for a vehicle, comprising;
   a first segment comprising a first connection feature at one end;
   a second segment comprising a second connection feature, the first and second segments being engaged together to form an aperture extending at least partially through the first and second connection features; and
   a bushing press fit and swaged through the aperture to thereby form a generally wishbone shaped base at the one end, the bushing being configured to provide an independent connection between the first and second segments sufficient to accommodate expected operating loads when the control arm is assembled into the vehicle,
   wherein the first connection feature comprises a pair of opposing rings defining a gap therebetween, and the second connection feature comprises a ring seated in the gap, wherein the aperture is defined at least in part by inner surfaces of the ring and the pair of opposing rings.

13. The control arm assembly of claim 12, further comprising:
   a third connection feature arranged at an end of the first segment opposite the first connection feature configured to interface with a first component in the vehicle, and a fourth connection feature arranged at an end of the second segment opposite the second connection feature configured to interface with a second component in the vehicle.

14. The control arm assembly of claim 12, wherein the second segment comprises a ridge abutting a body of the second segment arranged between an inner portion of the second connecting feature and the second segment, the ridge configured to receive a portion of the first connecting feature.

15. The control arm assembly of claim 12, wherein the first segment comprises one or more recesses in which a portion of the swaged bushing is formed.

16. The control arm assembly of claim 12, wherein the first and second segments are configured to minimize out-of-plane loads with respect to a geometry of the control arm assembly.

17. The control arm assembly of claim 12, wherein the first and second segments comprise additively manufactured segments.

* * * * *